United States Patent
Kumar et al.

(10) Patent No.: US 9,576,167 B2
(45) Date of Patent: Feb. 21, 2017

(54) LOCATING PARTS WITH ELECTROMAGNETIC IDENTIFICATION (EMID) TAGS FOR CONTEXTUAL VISUALIZATION

(71) Applicant: THE BOEING COMPANY, Chicago, IL (US)

(72) Inventors: Anil Kumar, Chicago, IL (US); Winfeng Li, Chicago, IL (US); Arun Ayyagari, Chicago, IL (US); Kevin Y. Ung, Chicago, IL (US); Sudhakar S. Shetty, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 236 days.

(21) Appl. No.: 14/303,440

(22) Filed: Jun. 12, 2014

(65) Prior Publication Data

US 2015/0363616 A1    Dec. 17, 2015

(51) Int. Cl.
*G08B 5/22* (2006.01)
*G06K 7/10* (2006.01)
*G01S 13/75* (2006.01)

(52) U.S. Cl.
CPC ........... *G06K 7/10366* (2013.01); *G01S 13/75* (2013.01); *G06K 7/10099* (2013.01); *G06K 7/10386* (2013.01)

(58) Field of Classification Search
CPC ........ G01S 13/74; G01S 13/75; G01S 13/878; G06K 7/10009; G06K 7/10118; G06K 7/10128; G06K 7/10158; G06K 7/10217; G06K 7/10356; H04Q 2209/47; H04Q 9/00
See application file for complete search history.

(56) References Cited

U.S. PATENT DOCUMENTS

| | | | |
|---|---|---|---|
| 2005/0104736 A1* | 5/2005 | Gudat | B66C 15/045 340/686.6 |
| 2008/0100450 A1* | 5/2008 | Ayyagari | B64D 25/18 340/572.7 |
| 2010/0148985 A1* | 6/2010 | Lin | G06K 7/10356 340/8.1 |
| 2013/0154801 A1* | 6/2013 | O'Haire | G06K 7/10009 340/10.1 |
| 2013/0278386 A1* | 10/2013 | Zumsteg | H04Q 9/00 340/10.1 |

* cited by examiner

*Primary Examiner* — Kerri McNally
*Assistant Examiner* — Renee Dorsey
(74) *Attorney, Agent, or Firm* — Vista IP Law Group LLP; Cynthia A. Dixon (57) ABSTRACT

In one or more embodiments, a disclosed method involves transmitting a first transmit signal(s) having a first signal strength and/or a first field of view (FOV), thereby establishing a first radiation region. The method further involves receiving a first receive signal(s) radiated from an EMID tag(s). Also, the method involves transmitting a second transmit signal(s) having a second signal strength and/or a second field of view (FOV), thereby establishing a second radiation region. In addition, the method involves receiving a second receive signal(s) radiated from an EMID tag(s). Additionally, the method involves subtracting the second radiation region from the first radiation region to determine a difference region. Also, the method involves determining which of the EMID tags are located within the difference region by using the first receive signal(s) and the second receive signal(s). Further, the method involves determining a location of the EMID tag(s) located within the difference region.

20 Claims, 8 Drawing Sheets

LOCATING PARTS WITH ELECTROMAGNETIC IDENTIFICATION (EMID) TAGS FOR CONTEXTUAL VISUALIZATION

FIELD

The present disclosure relates to electromagnetic identification (EMID) tags. In particular, it relates to locating parts with EMID tags for contextual visualization.

BACKGROUND

Currently, parts are generally located on an aircraft manually (e.g., by a person physically reading the identification number directly off of the part itself). This process is tedious and very time consuming. There is no automated way of accurately determining the location of a part on an aircraft that will help improve production efficiency.

It should be noted that global Positional System (GPS) based location systems are not suitable for an accurate positioning of objects in an indoor environment, such as in an aircraft cabin. Many positioning systems for indoor applications that are being developed rely on a Wi-Fi infrastructure and a passive radio frequency identification (RFID) technology. Most of the traditional methods employ triangulation of the radio frequency (RF) parameters, such as receive signal strength indicator (RSSI), time difference of arrival (TDOA), and angle of arrival (AOA). On an aircraft, the constraints of weight restrictions and the RF propagation conditions being less than benign make these traditional methods unsuitable to locate parts.

As such, there is a need for an improved method to locate parts on an aircraft.

SUMMARY

The present disclosure relates to a method, system, and apparatus for locating parts with electromagnetic identification (EMID) tags for contextual visualization. In one or more embodiments, a method for locating parts with electromagnetic identification (EMID) tags on a vehicle involves transmitting, with at least one transmit antenna on an EMID reader, at least one first transmit signal having a first signal strength and/or a first field of view (FOV), thereby establishing a first radiation region. The method further involves receiving, with at least one receive antenna on the EMID reader, at least one first receive signal radiated from at least one of the EMID tags. Also, the method involves transmitting, with at least one transmit antenna on the EMID reader, at least one second transmit signal having a second signal strength and/or a second field of view (FOV), thereby establishing a second radiation region. In addition, the method involves receiving, with at least one receive antenna on the EMID reader, at least one second receive signal radiated from at least one of the EMID tags. Additionally, the method involves subtracting, by at least one processor, the second radiation region from the first radiation region to determine a difference region. Also, the method involves determining, by at least one processor, which of the EMID tags are located within the difference region by using at least one first receive signal and at least one second receive signal. Further, the method involves determining, by at least one processor, a location of the EMID tags located within the difference region.

In one or more embodiments, the method further involves repeatedly transmitting, with at least one transmit antenna on the EMID reader, successive transmit signals having different signal strengths and/or different FOVs; and repeatedly receiving, with at least one receive antenna on the EMID reader, successive receive signals radiated from at least one of the EMID tags.

In at least one embodiment, the vehicle is an airborne vehicle, a terrestrial vehicle, or a marine vehicle. In some embodiments, the EMID reader is a mobile device or a stationary device. In one or more embodiments, the EMID reader is a handheld device or a device mounted on a tripod.

In one or more embodiments, a first signal strength and a second signal strength are the same or different. In at least one embodiment, the first FOV and the second FOV are the same or different. In some embodiments, at least one transmit antenna is a gimbaled antenna or a phased array.

In at least one embodiment, the method further involves determining, by a gyro of the EMID reader, an orientation of the EMID reader. In some embodiments, the method further involves determining, by at least one processor, a location of the EMID reader by referring to a preset location, using an EMID tag in a known location, using a Wi-Fi source, and/or using a light emitting diode (LED) source.

In one or more embodiments, at least one of the EMID tags is a radio frequency identification (RFID) tag, an ultra high frequency identification (UHFID) tag, and/or a Wi-Fi identification (Wi-Fi ID) tag. In at least one embodiment, at least one of the EMID tags is an active tag or a passive tag.

In at least one embodiment, the method further involves including, by at least one processor, the location of the EMID tags into a map of the vehicle. In some embodiments, the method further involves including, by at least one processor, metadata for the EMID tags that are included in the map of the vehicle. In one or more embodiments, the metadata comprises a part number, a serial number, a production date, an installation date, and/or test data.

In one or more embodiments, a system for locating parts with electromagnetic identification (EMID) tags on a vehicle involves at least one transmit antenna on an EMID reader to transmit at least one first transmit signal having a first signal strength and/or a first field of view (FOV), thereby establishing a first radiation region; and to transmit at least one second transmit signal having a second signal strength and/or a second field of view (FOV), thereby establishing a second radiation region. The system further involves at least one receive antenna on the EMID reader to receive at least one first receive signal radiated from at least one of the EMID tags, and to receive at least one second receive signal radiated from at least one of the EMID tags. Also, the system involves at least one processor to subtract the second radiation region from the first radiation region to determine a difference region, to determine which of the EMID tags are located within the difference region by using at least one first receive signal and at least one second receive signal, and to determine a location of the EMID tags located within the difference region.

In at least one embodiment, the system further involves a gyro of the EMID reader to determine an orientation of the EMID reader. In some embodiments, at least one processor is further to determine a location of the EMID reader by referring to a preset location, using a EMID tag in a known location, using a Wi-Fi source, and/or using a light emitting diode (LED) source. In one or more embodiments, at least one processor is further to include the location of the EMID tags into a map of the vehicle. In at least one embodiment, at least one processor is further to include metadata for the EMID tags that are included in the map of the vehicle.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIGS. 1-7 illustrate the disclosed method for locating parts with EMID tags on a vehicle, in accordance with at least one embodiment of the present disclosure.

FIGS. 2-4 depict the disclosed method for locating parts with EMID tags on a vehicle that utilizes the relative angular location of the EMID tags, in accordance with at least one embodiment of the present disclosure.

FIGS. 5-7 the disclosed method for locating parts with EMID tags on a vehicle that utilizes the relative distance location of the EMID tags, in accordance with at least one embodiment of the present disclosure.

DESCRIPTION

The methods and apparatus disclosed herein provide an operative system for locating parts with electromagnetic identification (EMID) tags for contextual visualization. The disclosed system provides a method for locating EMID tags affixed to parts on an aircraft by utilizing an EMID reader in a three-dimensional plane. The EMID reader estimates the relative radial distance and angular position between the EMID reader and the aircraft part(s) within the EMID reader's field of view (FOV) determined by the transmit power and the solid angle of a directional antenna.

This method accurately determines the location of an aircraft part by comparing the part(s) within successive FOVs in three-dimensions. An accurate position of the aircraft part is then calculated based on the initial reference position of the EMID reader, which is determined by the available infrastructure at that location. This two-dimensional/three-dimensional visualization will then be overlaid into a panoramic view representing the surroundings similar to a panoramic photo/video created from a still camera to provide details of the part with a contextual view. The parts which appear on the image will contain metadata (e.g., the part number and the serial number), which is similar to the process of tagging an object/human within an image captured by a camera.

With many aircraft parts affixed with EMID tags, this disclosed method will improve the production process in not only collecting the information on the parts as part of the "as delivered" configuration, but also to accurately determine the location of the part that can be verified by a quality assurance (QA) team.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with, and that the system described herein is merely one example embodiment of the invention.

For the sake of brevity, conventional techniques and components related to signal processing, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

FIGS. 1-7 illustrate the disclosed method for locating parts with EMID tags 120a-c on a vehicle, in accordance with at least one embodiment of the present disclosure.

Figure 1:
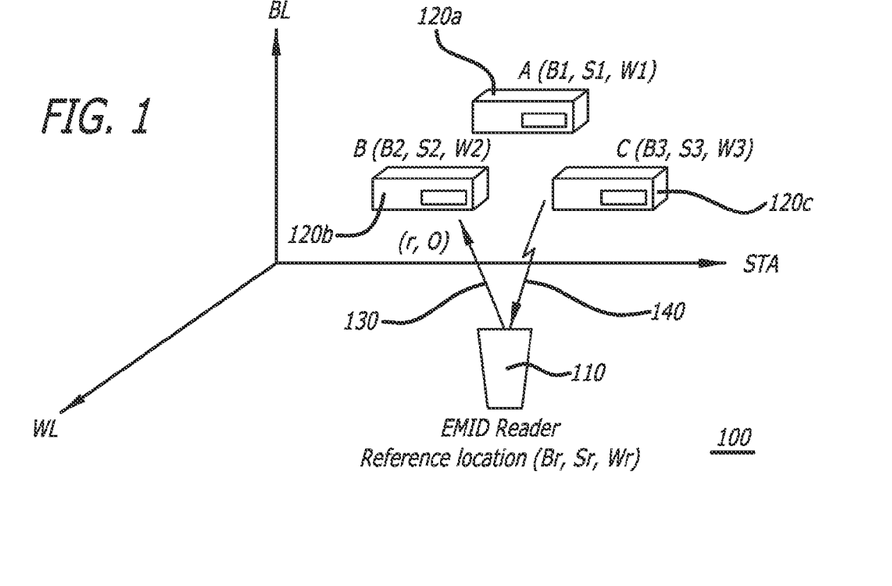
FIG. 1 is a schematic diagram showing an electromagnetic identification (EMID) reader and three EMID tags within a graph depicting the aircraft coordinate system, in accordance with at least one embodiment of the present disclosure.

FIG. 1 is a schematic diagram 100 showing an electromagnetic identification (EMID) reader 110 and three EMID tags 120a-c within a graph depicting the aircraft coordinate system, in accordance with at least one embodiment of the present disclosure. In this figure, an aircraft coordinate system is shown. The aircraft coordinate system comprises a station (STA) axis, a butt line (BL) axis, and a water line (WL) axis.

The EMID tags 120a-c are each affixed to a separate asset (e.g., a piece of equipment or unit) on a vehicle (e.g., an aircraft). EMID tag A 120a is located at coordinate B1, S1, W1; EMID tag B 120b is located at coordinate B2, S2, W2; and EMID tag C 120c is located a coordinate B3, S3, W3. The EMID reader 110 is located at coordinate Br, Sr, Wr.

During operation, in one or more embodiments, the EMID reader 110 transmits at least one first transmit signal 130 towards the EMID tags 120a-c. In response, the EMID tags 120a-c transmit at least one second transmit signal (e.g., a response signal) 140 back to the EMID reader 110.

Figure 2:
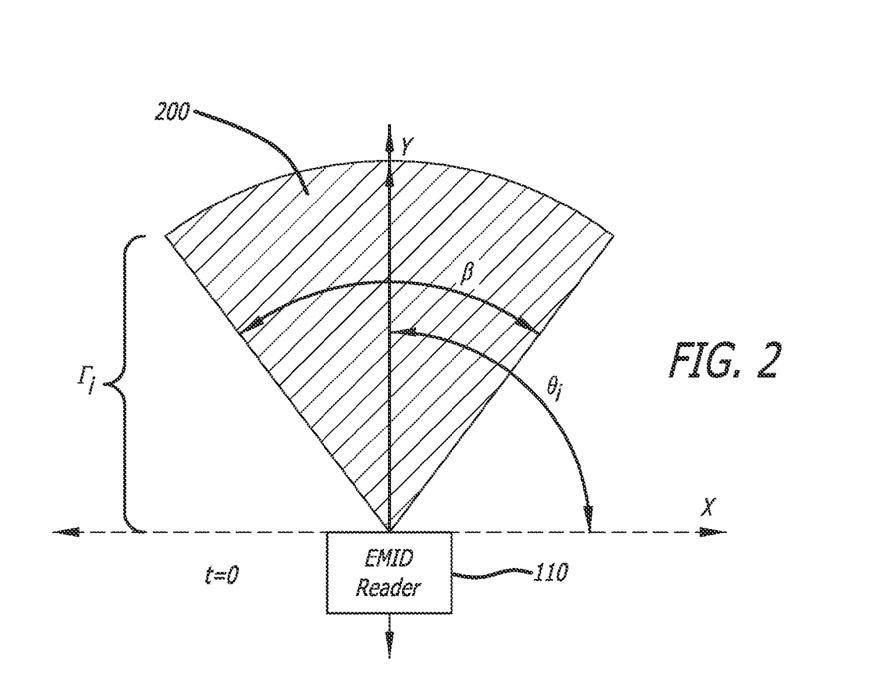
FIG. 2 is a schematic diagram of an EMID reader radiating a first transmit signal having a first signal strength and a first field of view (FOV), thereby establishing a first radiation region, in accordance with at least one embodiment of the present disclosure.
Figure 3:
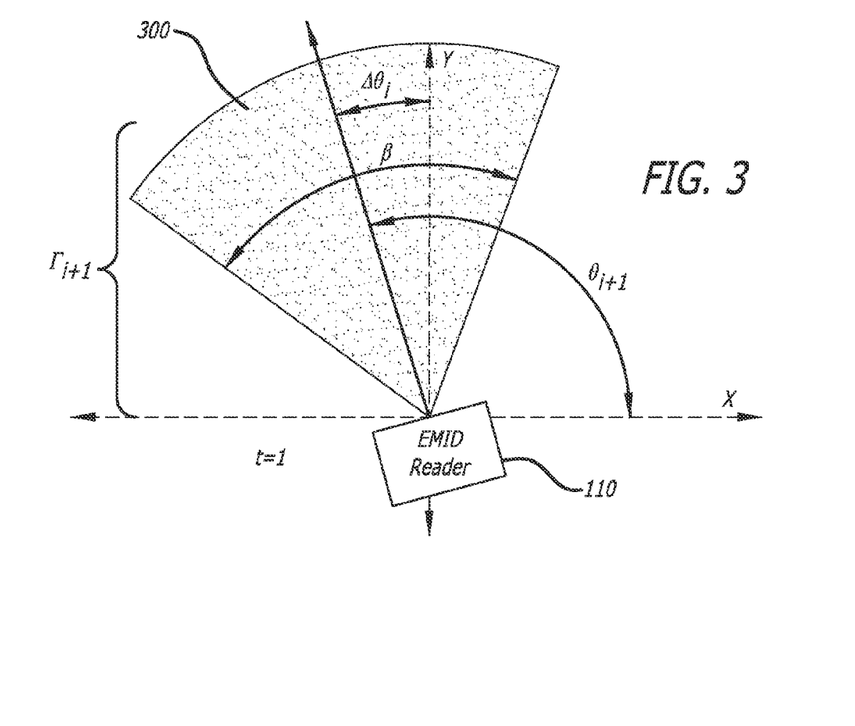
FIG. 3 is a schematic diagram of an EMID reader radiating a second transmit signal having the first signal strength of the first transmit signal of FIG. 2 and a second FOV, thereby establishing a second radiation region, in accordance with at least one embodiment of the present disclosure.
Figure 4:
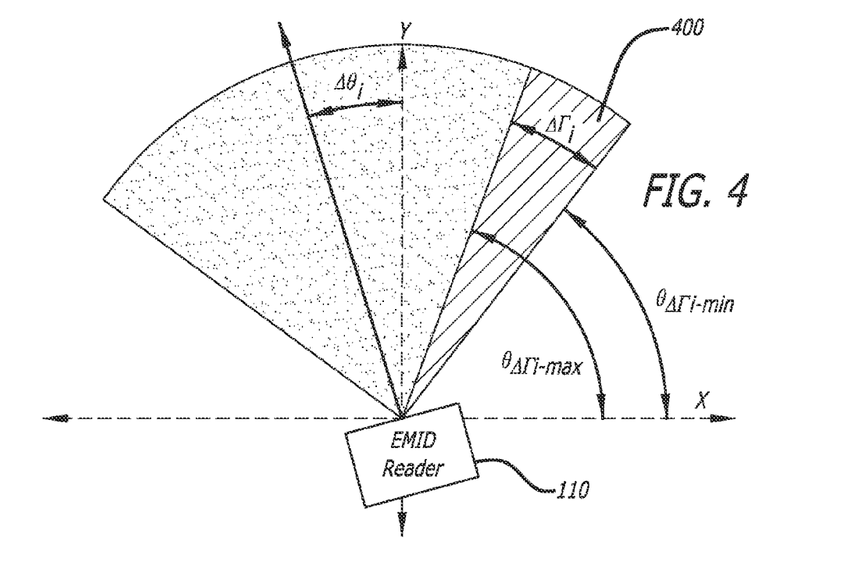
FIG. 4 is a schematic diagram depicting the difference region obtained by subtracting the second radiation region of FIG. 3 from the first radiation region of FIG. 2, in accordance with at least one embodiment of the present disclosure.

The method of FIGS. 2-4 will determine the locations of the EMID tags 120a-c with respect to the EMID reader's 110 bore angle. The method of FIGS. 5-7 will determine the locations of the EMID tags 120a-c by using the EMID tags 120a-c relative distance to the EMID reader 110. By coupling the method of FIGS. 2-4 with the method of FIGS. 5-7, a more precise location of each of the EMID tags 120a-c can be determined with respect to the EMID reader 110 angular location and distance.

Relative Angular Location

FIGS. 2-4 depict the disclosed method for locating parts with EMID tags 120a-c on a vehicle that utilizes the relative angular location of the EMID tags 120a-c, in accordance with at least one embodiment of the present disclosure.

FIG. 2 is a schematic diagram of an EMID reader 110 radiating a first transmit signal having a first signal strength and a first field of view (FOV), thereby establishing a first radiation region 200, in accordance with at least one embodiment of the present disclosure.

On a two-dimensional plane, at a given time t=0, the EMID reader 110 is shown with an initial bore axis $\theta_i$ and an EMID field of view (FOV) angle β centered on the bore axis. This positioning will allow the EMID reader 110 to generate an EMID FOV region $\Gamma_i$ (e.g., a first radiation region) 200.

FIG. 3 is a schematic diagram of an EMID reader 110 radiating a second transmit signal having the first signal strength of the first transmit signal of FIG. 2 and a second FOV, thereby establishing a second radiation region 300, in accordance with at least one embodiment of the present disclosure.

Let all EMID tags 120a-c read in EMID FOV region $\Gamma_i$ be denoted as the set $\{S_i\}$.

At time t=1, the EMID reader 110 is gimbaled by $\Delta\theta_i$, where $\Delta\theta_i < \beta$ will produce a new bore axis of $\theta_{i+1}$, which will allow the EMID reader 110 to generate a new EMID FOV region $\Gamma_{i+1}$ (e.g., a second radiation region) 300. It should be noted that this new EMID FOV region could be, alternatively, achieved by scanning the beam (e.g., by using a phased array) while keeping the EMID reader 110 at the same reference point and position.

FIG. 4 is a schematic diagram depicting the difference region 400 obtained by subtracting the second radiation region 300 of FIG. 3 from the first radiation region 200 of FIG. 2, in accordance with at least one embodiment of the present disclosure.

Let all EMID tags 120a-c read in EMID FOV region $\Gamma_{i+1}$ be denoted as the set $\{S_{i+1}\}$.

The resulting change in the EMID read area $\Delta\Gamma_i$ could be calculated by the determining the difference between $\Gamma_{i+1}$ and $\Gamma_i$ (e.g., a difference region) 400.

For the set of EMID tags in $\{S_i\}$ but not in $\{S_{i+1}\}$ or $\{S_{Aj}\}$=Difference ($\{S_i\}$, $\{S_{i+1}\}$), we will have a set of EMID tags in $\{S_{Aj}\}$ that must reside in the read area of $\Delta\Gamma_i$.

Therefore, if we rotate $\Delta\theta$ to cover the total desired region, we can determine which set of EMID tags were read corresponding to the change in the EMID FOV region $\Delta\Gamma_i$, which is a function of the change of EMID reader 110 bore angle $\Delta\theta_i$.

The above concept can be summarized as:

Let the function $f\alpha(\theta_i)$ be the EMID FOV region with respect to EMID reader 110 bore angle $\theta_i$.

$$f\alpha(\theta_i)=\Gamma_i$$

Let the function $r\alpha(\theta_i)$ be the set of EMID tags read with respect to EMID reader bore angle $\theta_i$.

$$r\alpha(\theta_i)=\{S_i\}$$

By rotating the EMID reader $\Delta\theta_i$, we will have new EMID FOV region and a new set of EMID tags read:

$$f\alpha(\theta_{i+1})=\Gamma_{i+1}$$

$$r\alpha(\theta_{i+1})=\{S_{i+1}\}$$

And taking the difference between the EMID FOV region and set of EMID tags:

$$f\alpha(\theta_{\Delta i})=\Gamma_{i+1}-\Gamma_{i+1}=\Delta\Gamma_i=\{\theta_{\Delta\Gamma i\text{-}min},\theta_{\Delta\Gamma i\text{-}max}\}$$

$$r\alpha(\theta_{\Delta i})=\text{Difference}(\{S_i\},\{S_{i+1}\})=\{S_{\Delta i}\}$$

Because $\Delta\Gamma_i \ll \Gamma_i$, the EMID tags in the set $\{S_{\Delta i}\}$ will have more precise information about their relative angular position.

Applying this concept from a two-dimensional (2D) plane to a three-dimensional (3D) plane is done in the same manner such that $\Delta\theta$ is the change in the x-y plane and $\Delta\Phi$ is the change in y-z plane:

$$f\alpha(\theta_{\Delta i},\Phi_{\Delta i})=\Gamma_{i+1}-\Gamma_i=\Delta\Gamma_i=\{\theta_{\Delta\Gamma i\text{-}min},\theta_{\Delta\Gamma i\text{-}max},\Phi_{\Delta\Gamma i\text{-}min},\Phi_{\Delta\Gamma i\text{-}max}\}$$

$$r\alpha(\theta_{\Delta i},\Phi_{\Delta i})=\text{Difference}(\{S_i\},\{S_{i+1}\})=\{S_{\Delta i}\}$$

This results in the corresponding location of the set of EMID tags read in that EMID FOV:

$$\{\theta_{\Delta\Gamma i\text{-}min},\theta_{\Delta\Gamma i\text{-}max},\Phi_{\Delta\Gamma i\text{-}min},\Phi_{\Delta\Gamma i\text{-}max}\}=\{S_{\Delta i}\}$$

With the concept above, the EMID boresight angle can be used as a point of reference to draw and display the relative angular distances between each EMID tag in a higher resolution than possible by traditional methods of locating parts with RF parameters, such as Residual Signal Strength Indicator (RSSI), Time of Arrival (TOA), Time Difference of Arrival (TDOA), and Angle of Arrival (AOA).

Relative Distance Location

Figure 5:
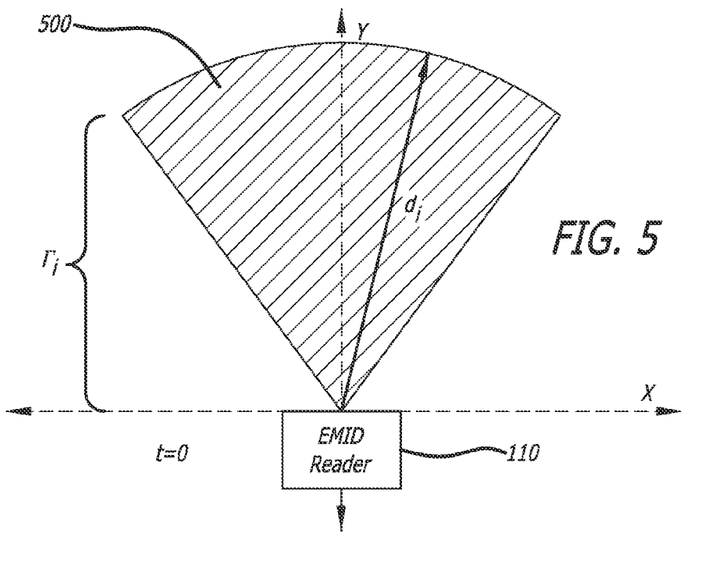
FIG. 5 is a schematic diagram of an EMID reader radiating a first transmit signal having a first signal strength and a first field of view (FOV), thereby establishing a first radiation region, in accordance with at least one embodiment of the present disclosure.
Figure 6:
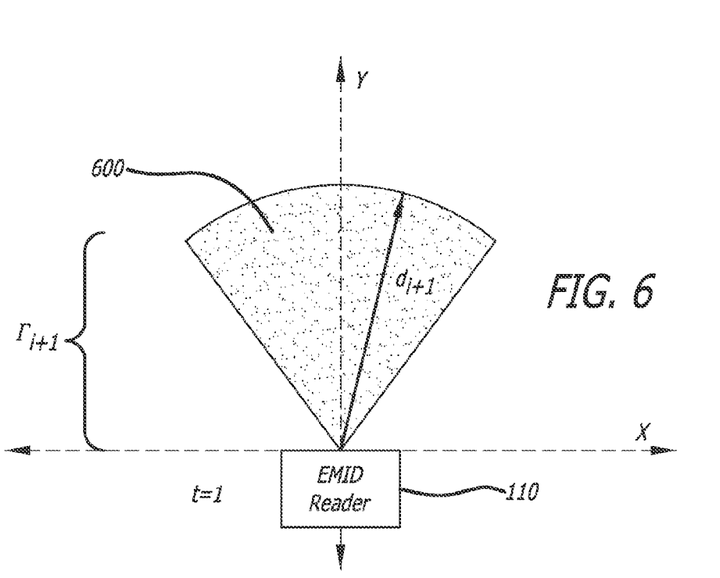
FIG. 6 is a schematic diagram of an EMID reader radiating a second transmit signal having a second signal strength and the first FOV of the first transmit signal of FIG. 5, thereby establishing a second radiation region, in accordance with at least one embodiment of the present disclosure.
Figure 7:
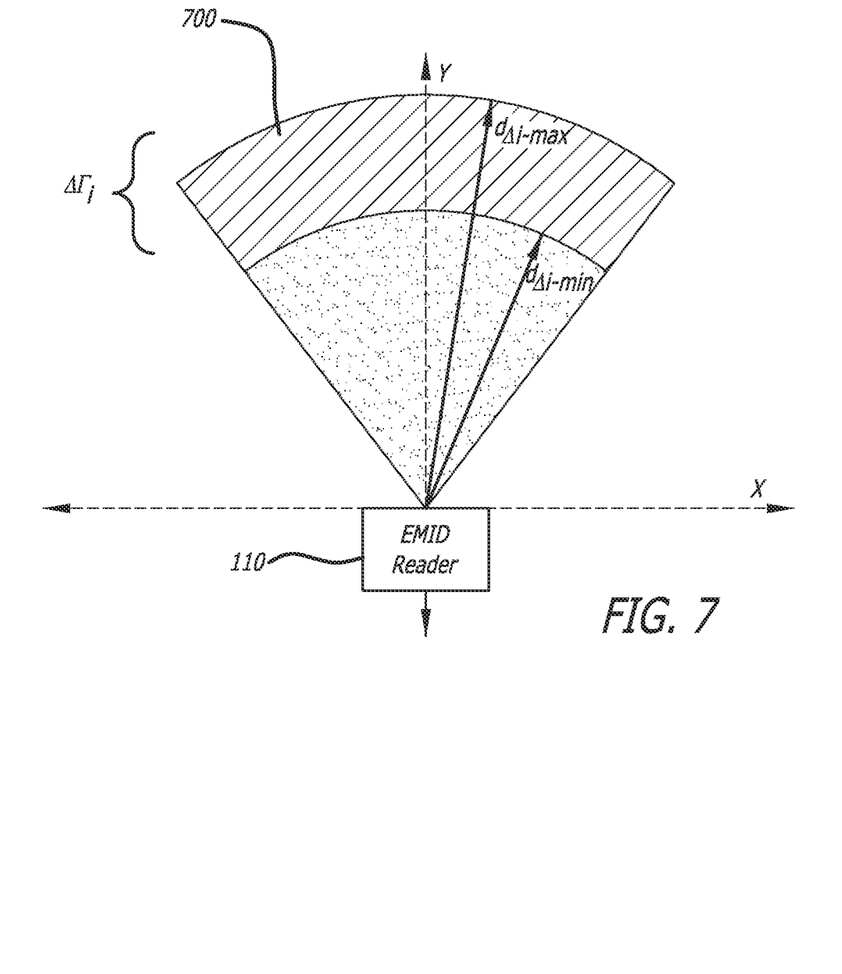
FIG. 7 is a schematic diagram depicting the difference region obtained by subtracting the second radiation region of FIG. 6 from the first radiation region of FIG. 5, in accordance with at least one embodiment of the present disclosure.

FIGS. 5-7 depict the disclosed method for locating parts with EMID tags 120a-c on a vehicle that utilizes the relative distance location of the EMID tags 120a-c, in accordance with at least one embodiment of the present disclosure.

FIG. 5 is a schematic diagram of an EMID reader 110 radiating a first transmit signal having a first signal strength and a first field of view (FOV), thereby establishing a first radiation region 500, in accordance with at least one embodiment of the present disclosure.

At a given time t=0, an EMID reader 110 with an initial RF power of $P_i$ generates an EMID FOV region $\Gamma_i$ (e.g., a first radiation region) 500 with a maximum read distance of $d_i$.

FIG. 6 is a schematic diagram of an EMID reader 110 radiating a second transmit signal having a second signal strength and the first FOV of the first transmit signal of FIG. 5, thereby establishing a second radiation region 600, in accordance with at least one embodiment of the present disclosure.

Let all EMID tags read in EMID FOV region $\Gamma_i$ be denoted as the set $\{S_i\}$.

At time t=1, if we reduce the power of the EMID reader 110 by $\Delta P_i$, the EMID reader 110 will generate a new EMID FOV region $\Gamma_{i+1}$ (e.g., a second radiation region) 600, such that the maximum read range $d_{i+1}$ will be less than $d_i$.

FIG. 7 is a schematic diagram depicting the difference region 700 obtained by subtracting the second radiation region 600 of FIG. 6 from the first radiation region 500 of FIG. 5, in accordance with at least one embodiment of the present disclosure.

Let all EMID tags read in EMID FOV region $\Gamma_{i+1}$ be denoted as the set $\{S_{i+1}\}$.

The resulting change in the EMID read area $\Delta\Gamma_i$ (e.g., a difference region) 700 could be calculated by the difference between $\Gamma_{i+1}$ and $\Gamma_i$.

For the set of EMID tags in $\{S_i\}$, but not in $\{S_{i+1}\}$ or $\{S_{\Delta j}\}$=Difference ($\{S_i\}, \{S_{i+1}\}$), we will have a set of EMID tags in $\{S_{\Delta i}\}$ that must reside in the read area of $\Delta\Gamma_i$. Therefore, we know the maximum ($d_{\Delta i\text{-}max}$) and minimum ($d_{\Delta i\text{-}min}$) distance of where all of the EMID tags in $\{S_{\Delta i}\}$ are relative to the EMID reader 110.

Therefore, if we perform EMID tag reads from the highest power setting to the minimum power setting, we can determine each set of EMID tags that were read corresponding to the change in EMID FOV region $\Delta\Gamma_i$ with respect to the EMID reader's 110 power settings.

The above concept could be summarized as below:

Let the function $fd(P_i)$ be the EMID FOV region with respect to EMID reader 110 power level $P_i$.

$$fd(P_i) = \Gamma_i$$

Let the function $rd(P_i)$ be the set of EMID tags read with respect to the EMID reader 110 power level $P_i$.

$$rd(P_i) = \{S_i\}$$

By decreasing the EMID reader 110 power level by $\Delta P_i$, we will have new EMID FOV region and a new set of EMID tags read:

$$fd(P_{i+1}) = \Gamma_{i+1}$$

$$rd(P_{i+1}) = \{S_{i+1}\}$$

And taking the difference between the EMID FOV region and set of EMID tags:

$$fd(\theta_{\Delta i}) = \Gamma_{i+1} - \Gamma_{i+1} = \Delta\Gamma_i = \{d_{\Delta i\text{-}max}, d_{\Delta i\text{-}min}\}$$

$$rd(\theta_{\Delta i}) = \text{Difference}(\{S_i\}, \{S_{i+1}\}) = \{S_{\Delta i}\}$$

Which will result in the corresponding distance location to the set of EMID tags read in that EMID FOV:

$$\{d_{\Delta i\text{-}max}, d_{\Delta i\text{-}min}\} = \{S_{\Delta i}\}$$

We can determine the relative distance of the set of EMID tags in $\{S_{\Delta i}\}$, and the higher resolution of power settings will result in a finer set of $\Delta\Gamma_i$, which will result in higher resolution of the distance location data.

Relative Angular Location and Relative Distance Location

By combining both the relative angular location (refer to FIGS. 2-4) and relative distance location (refer to FIGS. 5-7) methods above, we can determine a higher resolution three-dimensional projection of where each EMID tag 120*a-c* is located with reference to the EMID reader 110.

Below is exemplary pseudo-code that could be used to combine the relative angular location and relative distance location methods to create a three-dimensional mapping of where each EMID tag 120*a-c* is located with reference to the EMID reader 110.

The pseudo-code is as follows:

```
For each θ_Δi in θ_total
For each Φ_Δi in Φ_total
For each P_Δ in P_total
Calculate
  fa(θ_Δi,Φ_Δi) = Γ_i+1 − Γ_i+1 = ΔΓ_i = {θ_ΔΓi-min,θ_ΔΓi-max,Φ_ΔΓi-min,
    Φ_ΔΓi-max}
Calculate ra(θ_Δi ,Φ_Δi) = {S_i}\{S_i+1} = {S_Δi}_ra
Calculate fd(P_Δi) = Γ_i+1 − Γ_i = ΔΓ_i = {d_Δi-max,d_Δi-min}
Calculate rd(P_Δi) = Difference ({S_i},{S_i+1}) = {S_Δi}_rd
Map
  [{θ_ΔΓi-min,θ_ΔΓi-max,Φ_ΔΓi-min,Φ_ΔΓi-max},{d_Δi-max,
    d_Δi-min}] = {{S_Δi}_ra ∩ {S_Δi}_rd}
```

Based on the EMID tags scanned with their locations determined, a 2D mapping of the EMID tags read relative to each other can be constructed (e.g., generate a stereoscopic view based on the multiple EMID reader 110 scans and the EMID tags 120*a-c* scanned/read). With the inclusion of directionality information of the pointing orientation of the EMID reader, a 3D mapping of the EMID tags 120*a-c* scanned/read can be constructed.

This EMID tag location information is then directly mapped onto a wireframe diagram (e.g., a cutaway diagram) of the aircraft to present a 2D/3D visualization of the location of the aircraft parts, with the EMID reader 110 providing the reference location on aircraft. The EMID reader 110 reference location can be determined by the current aircraft infrastructure (e.g., from Wi-Fi or light emitting diode (LED) source enabled by a visible light communications (VLC) technology). Metadata collected as part of the automated data collection process can also be annotated into the 2D/3D visualization to provide the viewer with details relating to each specific part. The 2D/3D visualization can be built into an interactive 3D graphical visualization tool using, for example, the framework provided by HTML5.

An added benefit of this 2D/3D visualization would be the ability to detect foreign object debris (FOD) on the aircraft when the object is located at an unapproved location on the aircraft.

Figure 8:
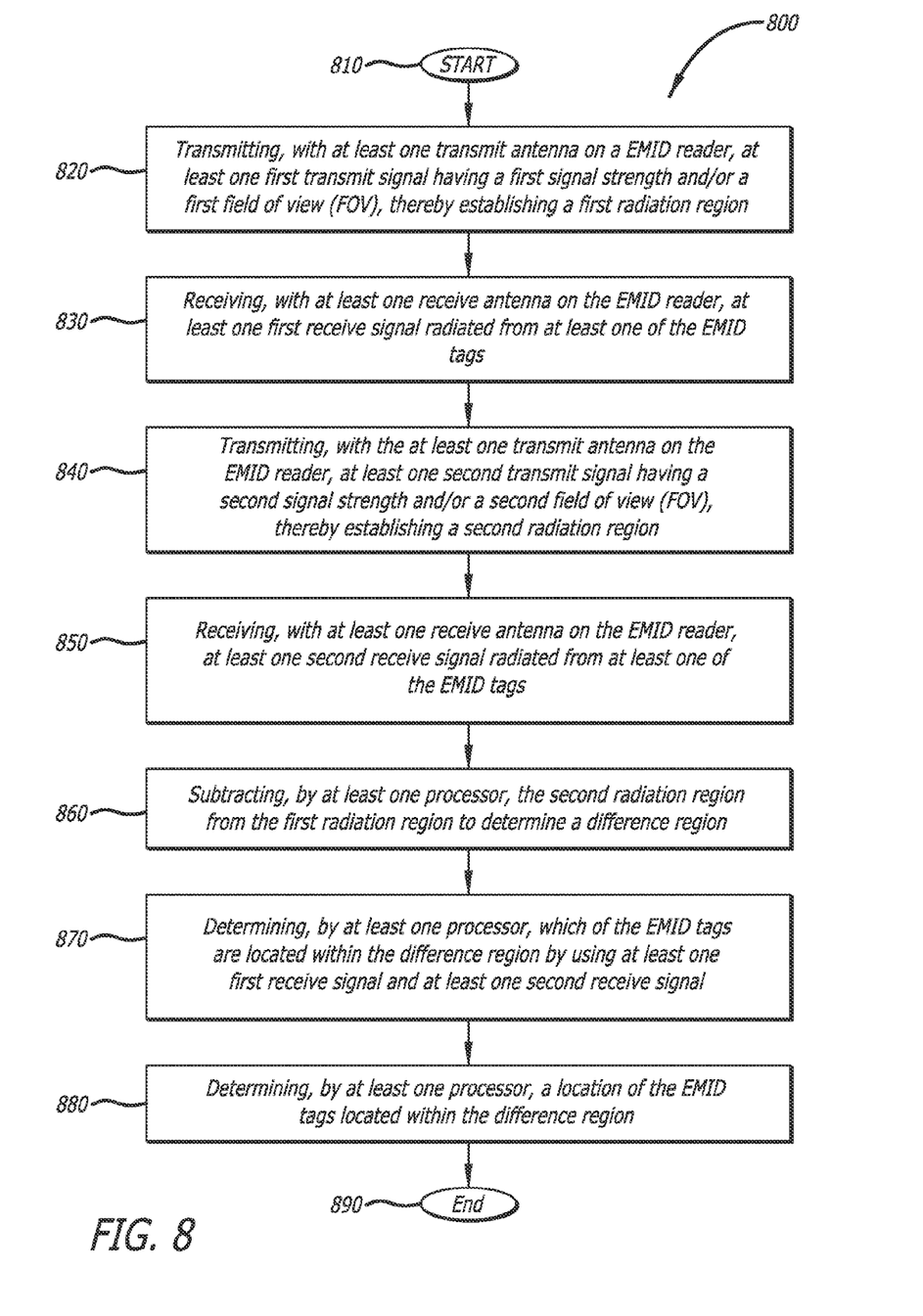
FIG. 8 is a flow chart for the disclosed method for locating parts with EMID tags on a vehicle utilizing the relative angular location and the relative distance location of the EMID tags, in accordance with at least one embodiment of the present disclosure.

FIG. 8 is a flow chart for the disclosed method 800 for locating parts with EMID tags on a vehicle utilizing the relative angular location and the relative distance location of the EMID tags, in accordance with at least one embodiment of the present disclosure. At the start 810 of the method 800, at least one transmit antenna on an EMID reader transmits at least one first signal having a first signal strength and/or a first field of view (FOV), thereby establishing a first radiation region 820. Then, at least one receive antenna on the EMID reader receives at least one first receive signal radiated from at least one of the EMID tags 830. At least one transmit antenna on the EMID reader transmits at least one second transmit signal having a second signal strength and/or a second FOV, thereby establishing a second radiation pattern 840. Then, at least one receive antenna on the EMID reader receives at least one second receive signal radiated from at least one of the EMID tags 850.

At least one processor then subtracts the second radiation pattern from the first radiation pattern to determine a difference region 860. At least one processor determines which of the EMID tags are located within the difference region by using at least one first receive signal and at least one second receive signal 870. At least one processer then determines the location of the EMID tags located within the difference region 880. Then, the method 800 ends 890.

It should be noted that in one or more embodiments, the vehicle is an airborne vehicle (e.g., an aircraft, a space plane, or a satellite), a terrestrial vehicle (e.g., a car, a truck, a train, or a tank), or a marine vehicle (e.g., a ship or a boat). In at least one embodiment, the EMID reader is a mobile device or a stationary device. In some embodiments, the EMID reader is a handheld device or a mounted device (e.g., a device mounted on a tripod). In one or more embodiments, the transmit antenna on the EMID reader is a gimbaled antenna or a phased array. In at least one embodiment, the receive antenna on the EMID reader is a gimbaled antenna or a phased array. In one or more embodiments, an EMID tag is a radio frequency identification (RFID) tag, an ultra high frequency identification (UHFID) tag, or a Wi-Fi identification (Wi-Fi ID) tag. In some embodiments, an EMID tag is an active tag, a passive tag, or a battery-assisted passive tag.

Also, it should be noted that in one or more embodiments, the method 800 further involves at least one transmit antenna on the EMID reader repeatedly transmitting successive transmit signals having different signal strengths and/or different FOVs, and at least one receive antenna on the EMID reader repeatedly receiving successive receive signals radiated from at least one of the EMID tags. In at least one embodiment, the method 800 further involves a gyroscope (i.e. a gyro) of the EMID reader determining the orientation of the EMID reader. In some embodiments, the method 800 further involves at least one processor of the EMID reader determining the location of the EMID reader by referring to a preset location, using an EMID tag in a known location, using a Wi-Fi source (e.g., using triangulation and/or ranging of the Wi-Fi signals), and/or using a light emitting diode (LED) source (e.g., using triangulation and/or ranging of the signals from the LED source).

Figure 9:
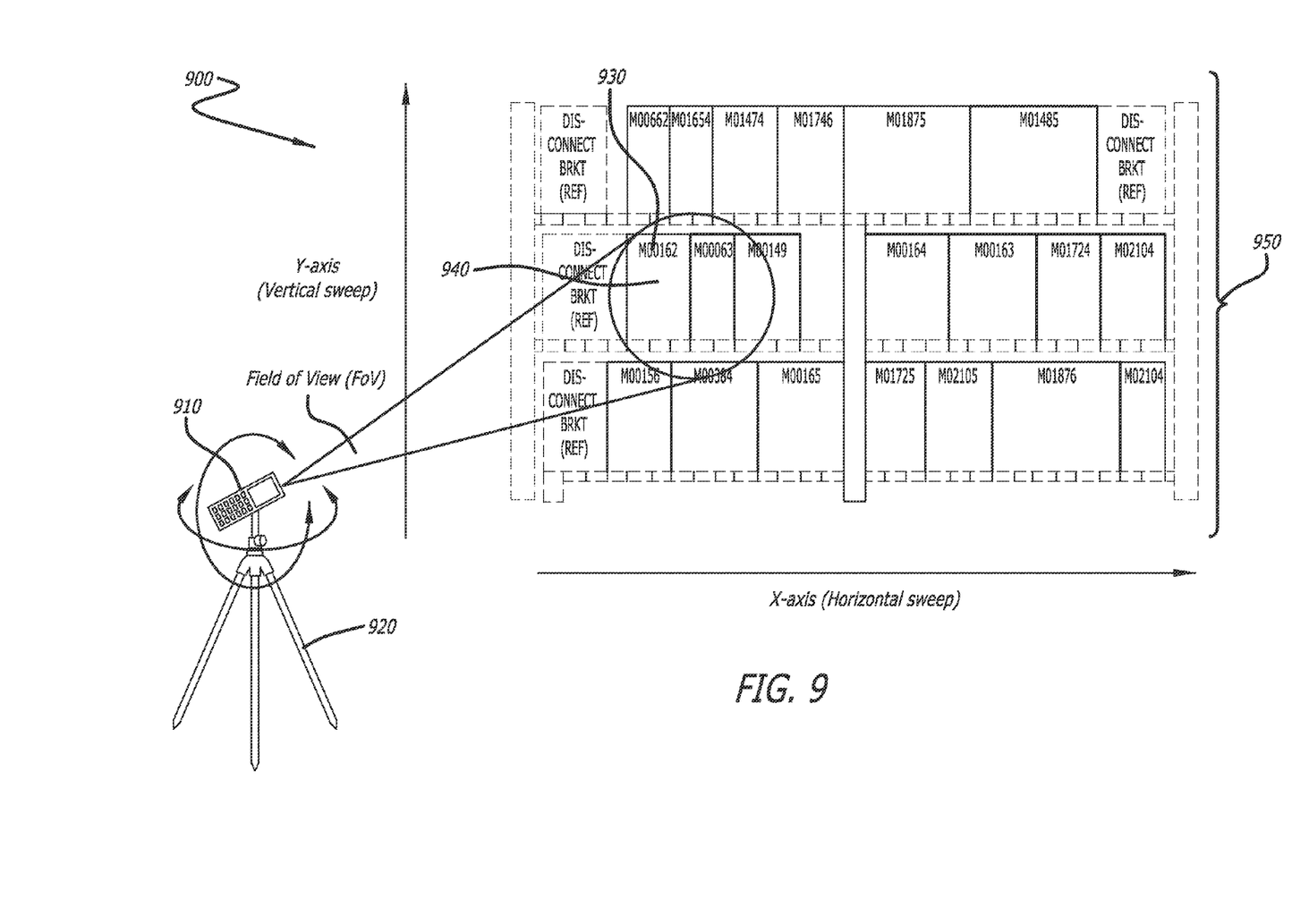
FIG. 9 is a diagram of an EMID reader mounted on a tripod reading EMID tags off of electronic equipment in a rack installed on a vehicle, in accordance with at least one embodiment of the present disclosure.

FIG. 9 is a diagram 900 of an EMID reader 910 mounted on a tripod 920 reading EMID tags 930 off of electronic equipment 940 in a rack 950 installed on a vehicle (e.g., an aircraft), in accordance with at least one embodiment of the present disclosure. In this figure, an EMID reader 910 is shown to be reading EMID tags 930 that are affixed to electronic equipment (e.g., a line replaceable unit (LRU)) 940 installed in an electronics rack 950 in a vehicle. The EMID reader 910 will be gimbaled along the x-axis and y-axis to determine 2D positioning of the electronic equipment 940 within the aircraft. In addition, the transmit power of the EMID reader 910 will be varied in the z-axis to determine the 3D mapping of the electronic equipment 940 within the aircraft.

Figure 10:
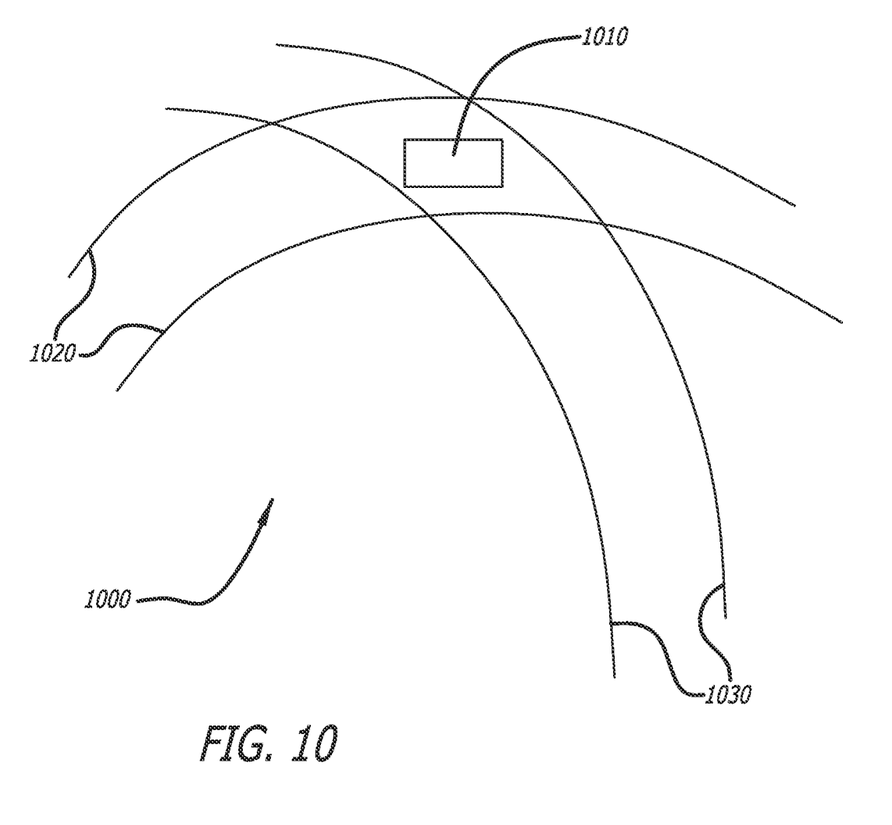
FIG. 10 is a diagram showing the radiation patterns around an EMID tag obtained by gimballing the EMID reader along the x-axis and along with y-axis, in accordance with at least one embodiment of the present disclosure.

FIG. 10 is a diagram 1000 showing the radiation patterns 1020, 1030 around an EMID tag 1010 obtained by gimballing the EMID reader along the x-axis and along with y-axis, in accordance with at least one embodiment of the present disclosure. In this figure, a single EMID tag 1010 is shown. Also, the radiation patterns 1020 obtained by gimballing the EMID reader along the y-axis are shown. And, the radiation patterns 1030 obtained by gimballing the EMID reader along the x-axis are shown.

Figure 11:
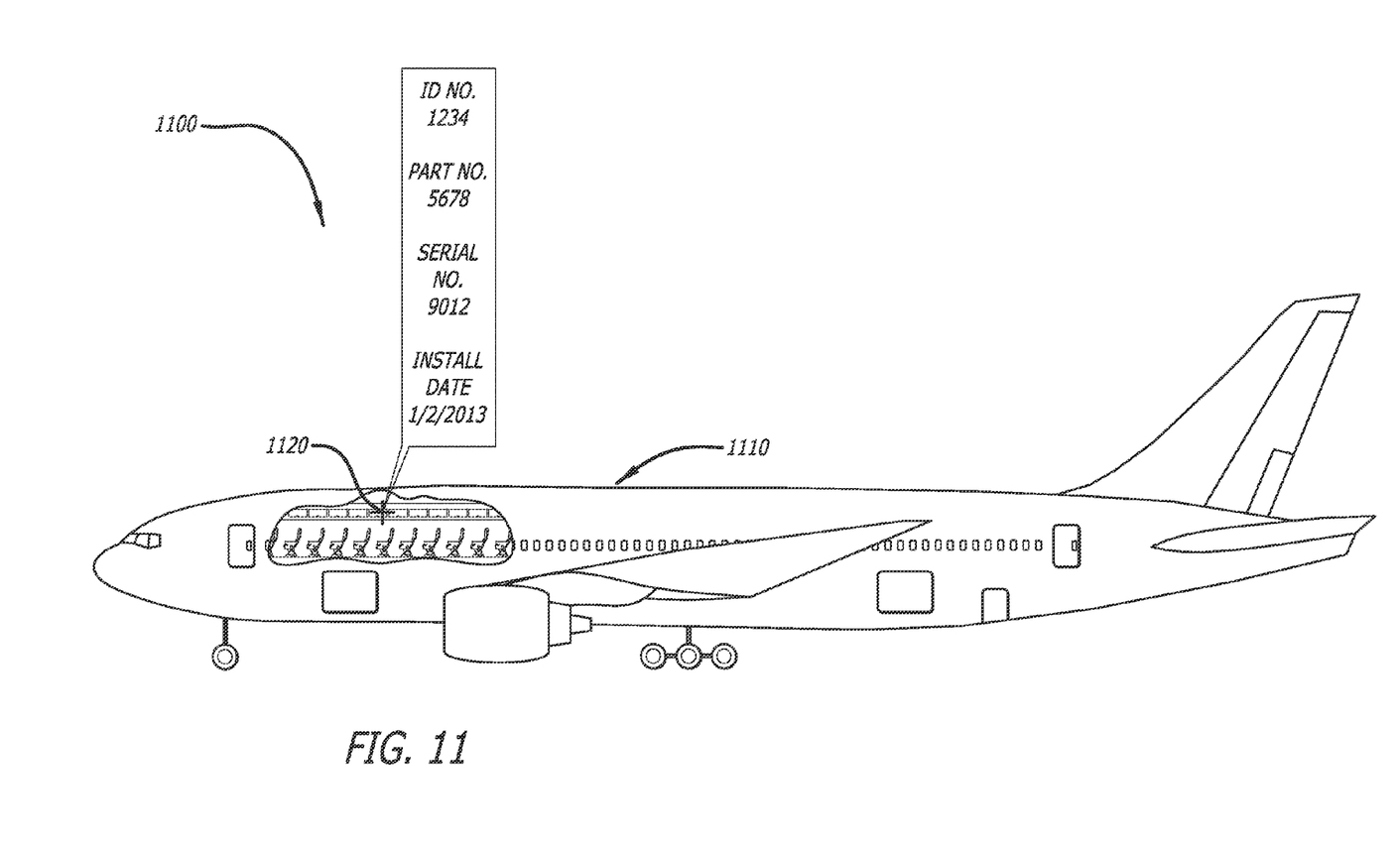
FIG. 11 is a diagram showing a map of an aircraft including the locations of EMID tags, in accordance with at least one embodiment of the present disclosure.

FIG. 11 is a diagram 1100 showing a map of an aircraft 1110 including the locations of EMID tags 1120, in accordance with at least one embodiment of the present disclosure. In this figure, an interactive 3D mapping of the locations of EMID tags 1120 affixed to assets (e.g., parts) installed within an aircraft 1110 is shown. When a user hovers a cursor over a particular asset on the aircraft 1110 mapping, information (e.g., metadata) relating to that particular asset is displayed to the user. The information relating to the asset may include, but is not limited to, a part number for the asset, a serial number for the asset, a production date of the asset, an installation date of the asset, and test data for the asset.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for locating parts with electromagnetic identification (EMID) tags on a vehicle, the method comprising:

transmitting, with at least one transmit antenna on an EMID reader, at least one first transmit signal having at least one of a first signal strength or a first field of view (FOV), thereby establishing a first radiation region;

receiving, with at least one receive antenna on the EMID reader, at least one first receive signal radiated from at least one of the EMID tags;

transmitting, with the at least one transmit antenna on the EMID reader, at least one second transmit signal having at least one of a second signal strength or a second field of view (FOV), thereby establishing a second radiation region;

receiving, with the at least one receive antenna on the EMID reader, at least one second receive signal radiated from at least one of the EMID tags;

subtracting, by at least one processor, the second radiation region from the first radiation region to determine a difference region;

determining, by the at least one processor, which of the EMID tags are located within the difference region by using the at least one first receive signal and the at least one second receive signal; and determining, by the at least one processor, a location of the EMID tags located within the difference region.

2. The method of claim 1, wherein the method further comprises:

repeatedly transmitting, with the at least one transmit antenna on the EMID reader, successive transmit signals having at least one of different signal strengths or different FOVs; and repeatedly receiving, with the at least one receive antenna on the EMID reader, successive receive signals radiated from at least one of the EMID tags.

3. The method of claim 1, wherein the vehicle is one of a airborne vehicle, terrestrial vehicle, or marine vehicle.

4. The method of claim 1, wherein the EMID reader is one of a mobile device or a stationary device.

5. The method of claim 1, wherein the EMID reader is one of a handheld device or a device mounted on a tripod.

6. The method of claim 1, wherein a first signal strength and a second signal strength are one of a same or different.

7. The method of claim 1, wherein the first FOV and the second FOV are one of a same or different.

8. The method of claim 1, wherein the at least one transmit antenna is one of a gimbaled antenna or a phased array.

9. The method of claim 1, wherein the method further comprises determining, by a gyro of the EMID reader, an orientation of the EMID reader.

10. The method of claim 1, wherein the method further comprises determining, by the at least one processor, a location of the EMID reader by at least one of referring to a preset location, using a EMID tag in a known location, using a Wi-Fi source, or using a light emitting diode (LED) source.

11. The method of claim 1, wherein at least one of the EMID tags is one of a radio frequency identification (RFID) tag, a ultra high frequency identification (UHFID) tag, or a Wi-Fi identification (Wi-Fi ID) tag.

12. The method of claim 1, wherein at least one of the EMID tags is one of an active tag or a passive tag.

13. The method of claim 1, wherein the method further comprises including, by the at least one processor, the location of the EMID tags into a map of the vehicle.

14. The method of claim 13, wherein the method further comprises including, by the at least one processor, metadata for the EMID tags that are included in the map of the vehicle.

15. The method of claim 14, wherein the metadata comprises at least one of a part number, a serial number, a production date, an installation date, or test data.

16. A system for locating parts with electromagnetic identification (EMID) tags on a vehicle, the system comprising:

at least one transmit antenna on an EMID reader to transmit at least one first transmit signal having at least one of a first signal strength or a first field of view (FOV), thereby establishing a first radiation region, and to transmit at least one second transmit signal having at least one of a second signal strength or a second field of view (FOV), thereby establishing a second radiation region;

at least one receive antenna on the EMID reader to receive at least one first receive signal radiated from at least one of the EMID tags, and to receive at least one second receive signal radiated from at least one of the EMID tags; and at least one processor to subtract the second radiation region from the first radiation region to determine a difference region, to determine which of the EMID tags are located within the difference region by using the at least one first receive signal and the at least one second receive signal, and to determine a location of the EMID tags located within the difference region.

17. The system of claim 16, wherein the system further comprises a gyro of the EMID reader to determine an orientation of the EMID reader.

18. The system of claim 16, wherein the at least one processor is further to determine a location of the EMID reader by at least one of referring to a preset location, using a EMID tag in a known location, using a Wi-Fi source, or using a light emitting diode (LED) source.

19. The system of claim 16, wherein the at least one processor is further to include the location of the EMID tags into a map of the vehicle.

20. The system of claim 19, wherein the at least one processor is further to include metadata for the EMID tags that are included in the map of the vehicle.

* * * * *